J. W. DENMEAD & J. P. WRIGHT.
BOX FILLING MACHINE.
APPLICATION FILED AUG. 1, 1912.
1,064,452.
Patented June 10, 1913.
8 SHEETS—SHEET 1.
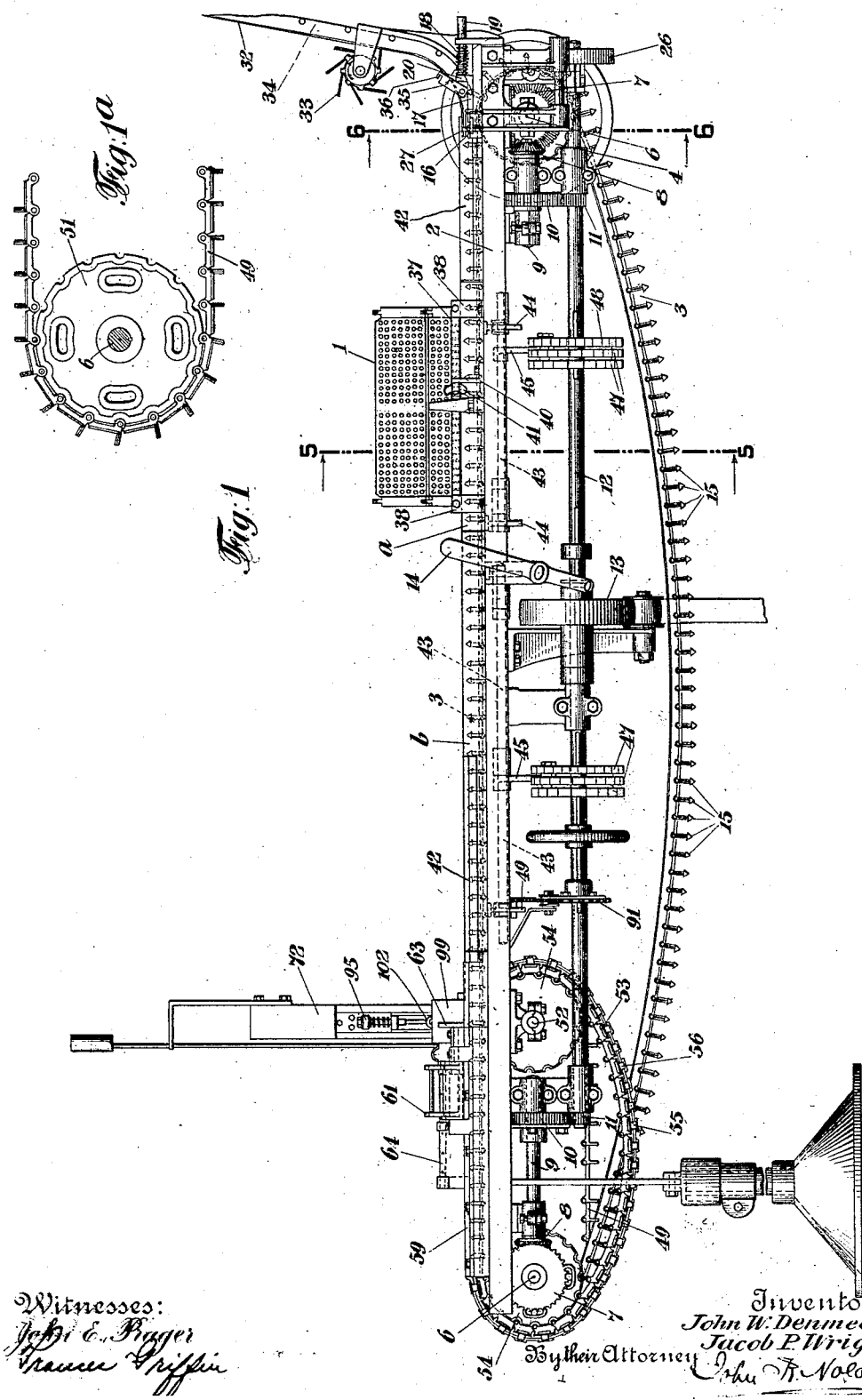
Witnesses:
Inventors
John W. Denmead
Jacob P. Wright
By their Attorney

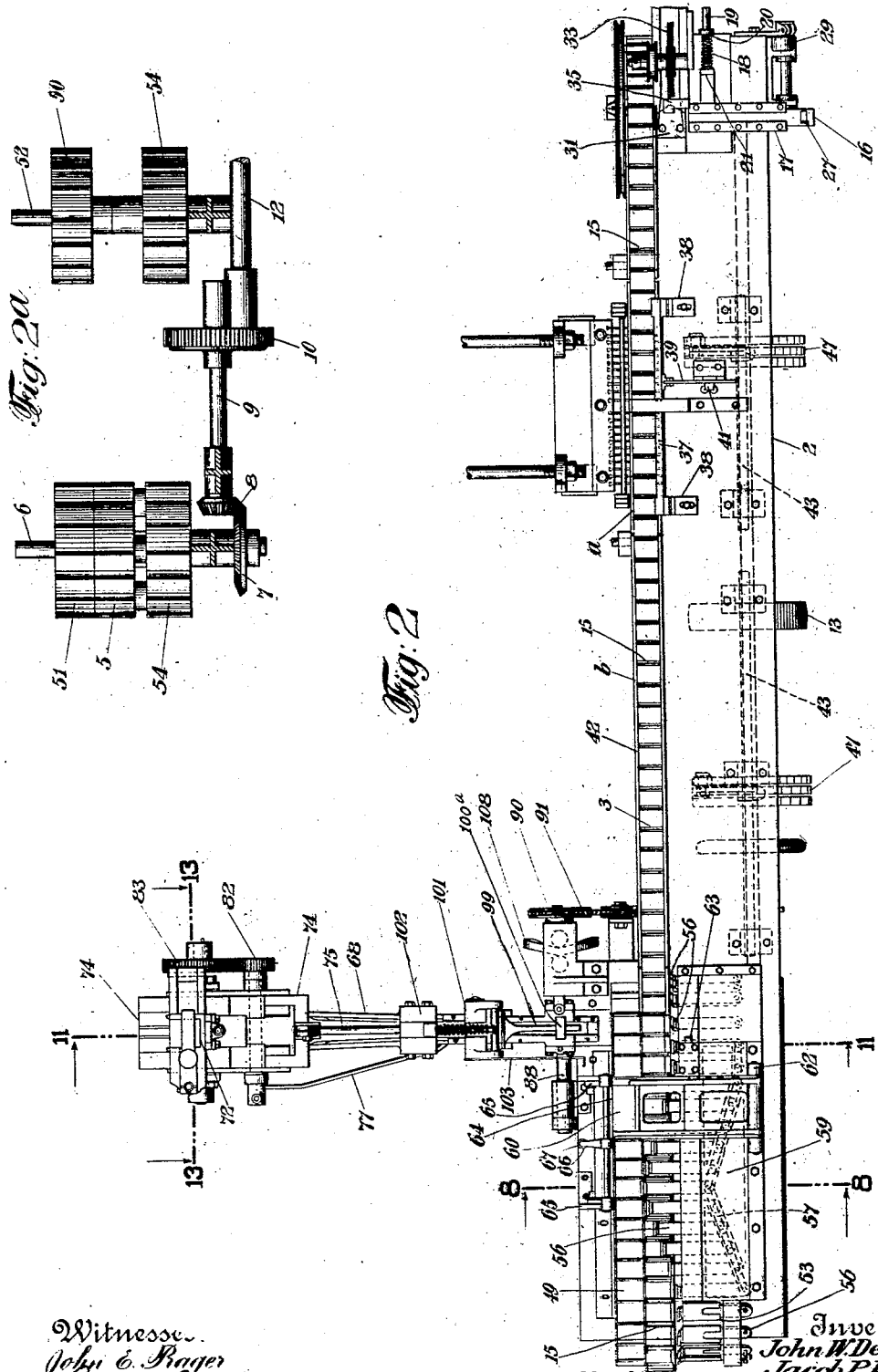

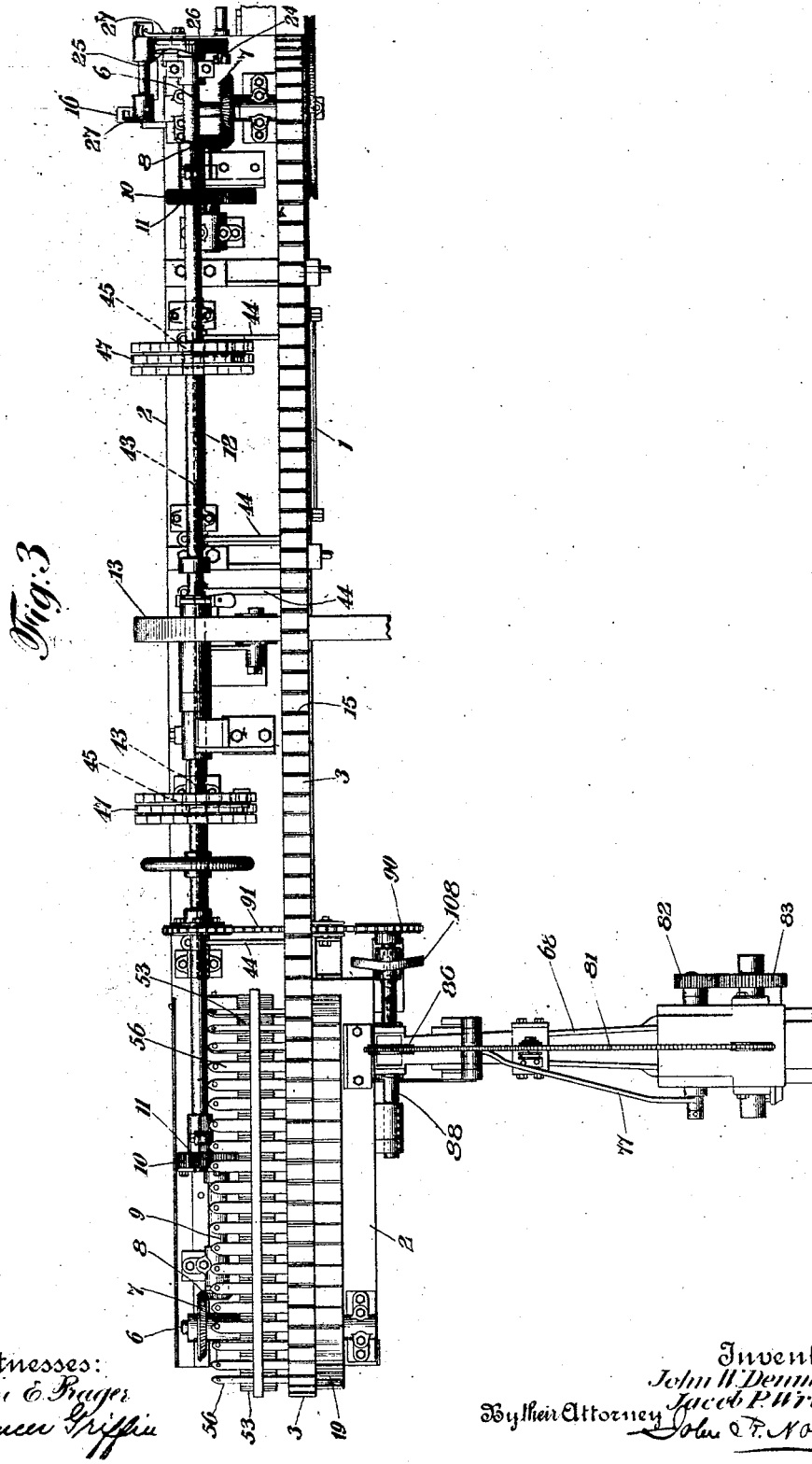

J. W. DENMEAD & J. P. WRIGHT.
BOX FILLING MACHINE.
APPLICATION FILED AUG. 1, 1912.
1,064,452.
Patented June 10, 1913.
8 SHEETS—SHEET 4.
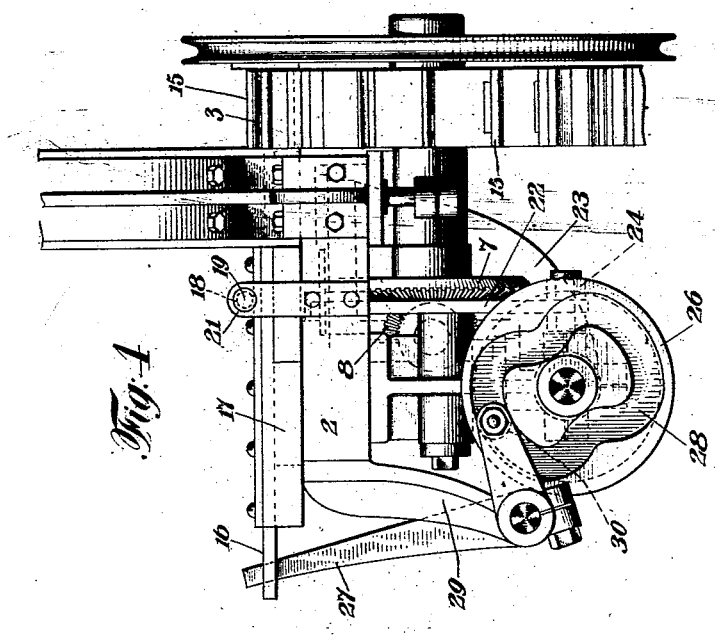
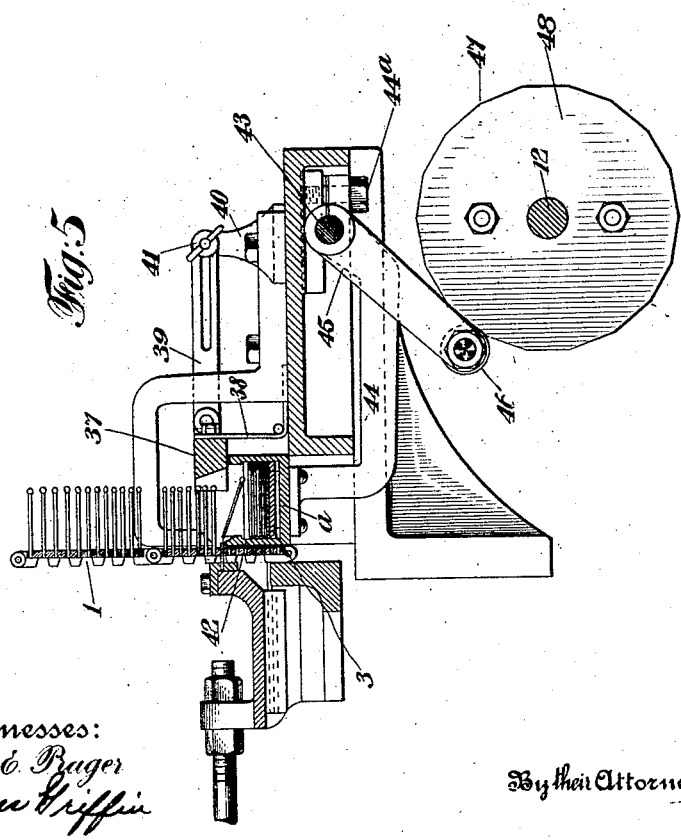
Witnesses:
John E. Rager
Frances Griffin
Inventors
John W. Denmead
Jacob P. Wright
By their Attorney
John P. Nolan

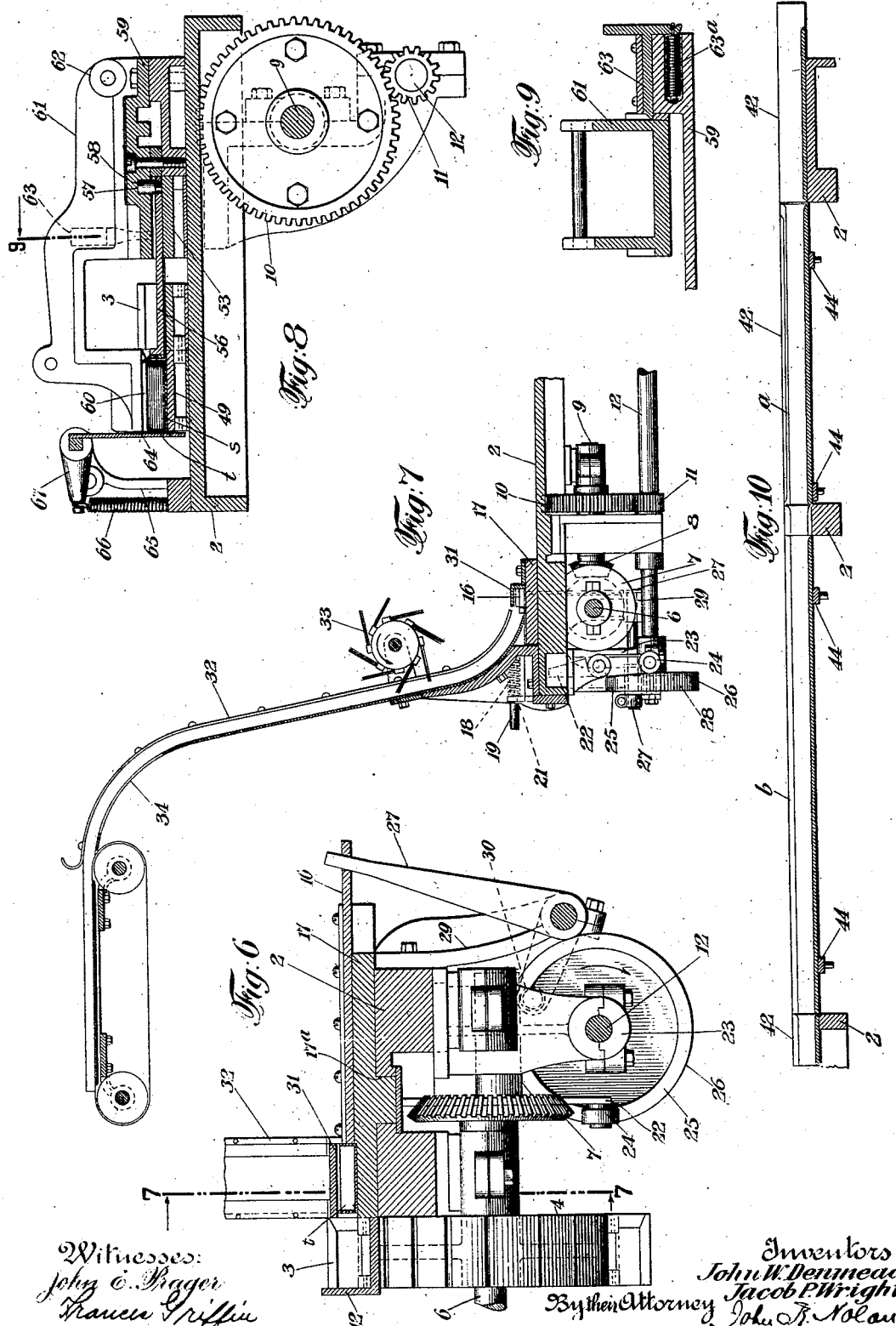

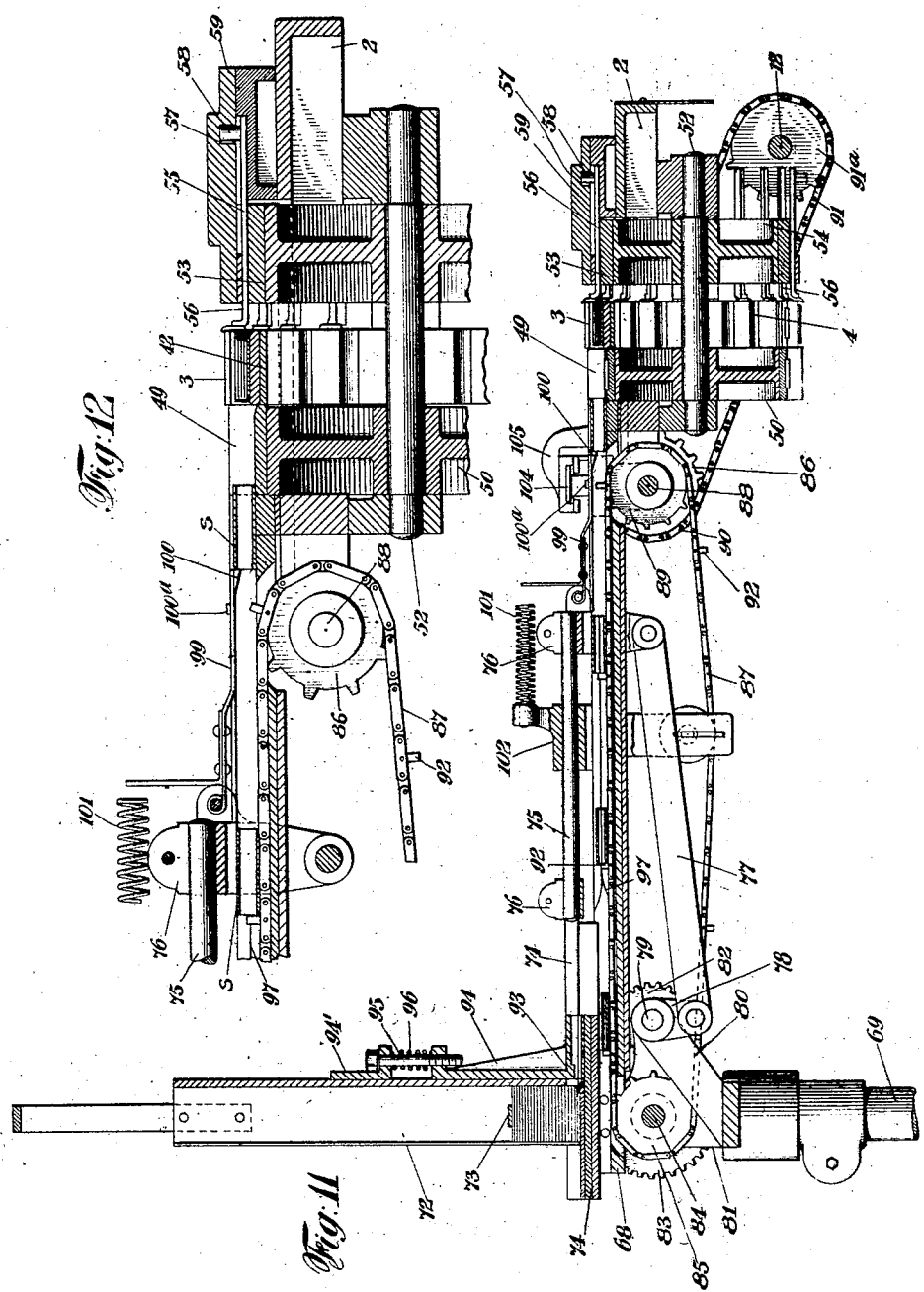

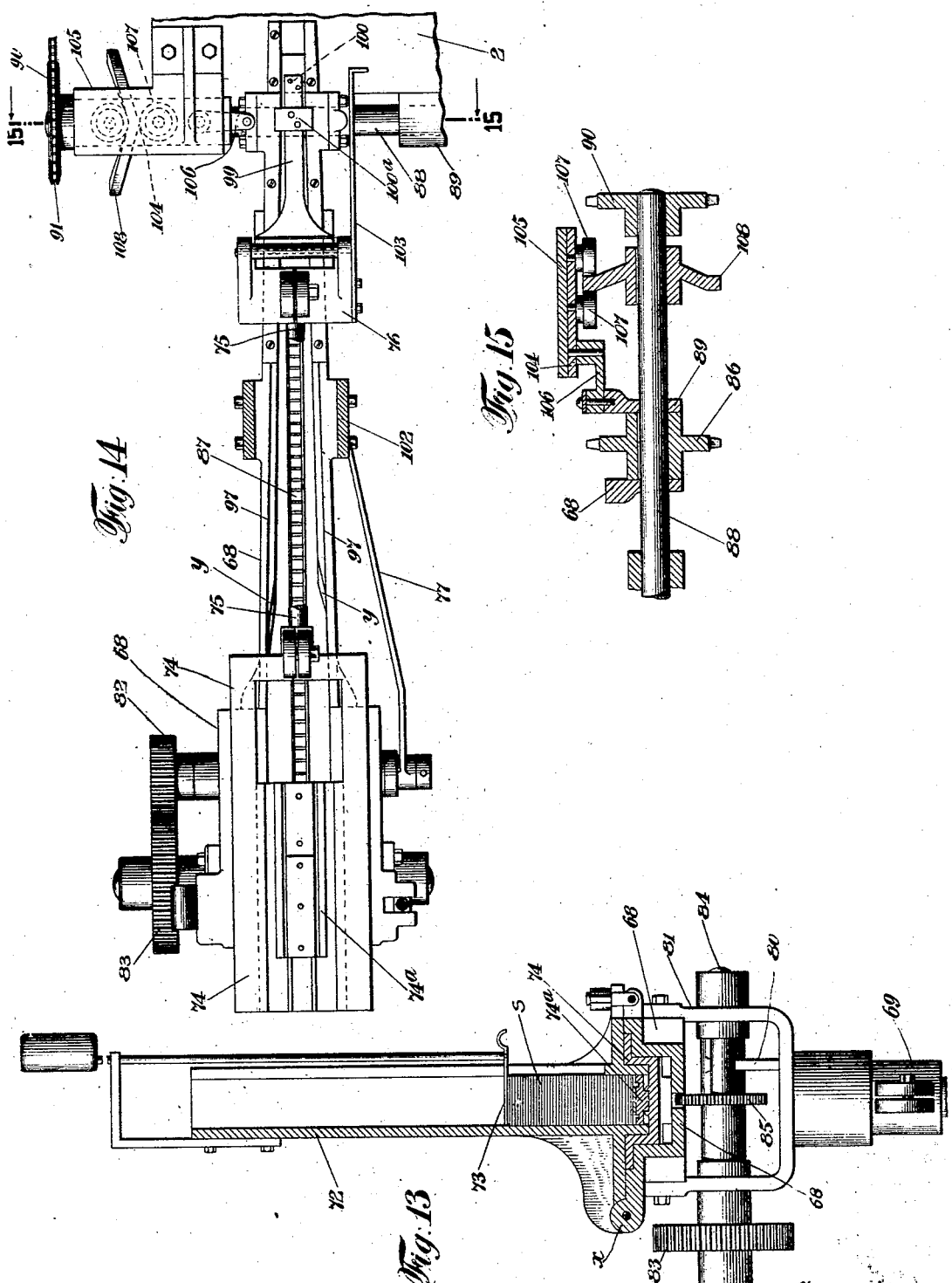

J. W. DENMEAD & J. P. WRIGHT.
BOX FILLING MACHINE.
APPLICATION FILED AUG. 1, 1912.
1,064,452.
Patented June 10, 1913.
8 SHEETS—SHEET 8.
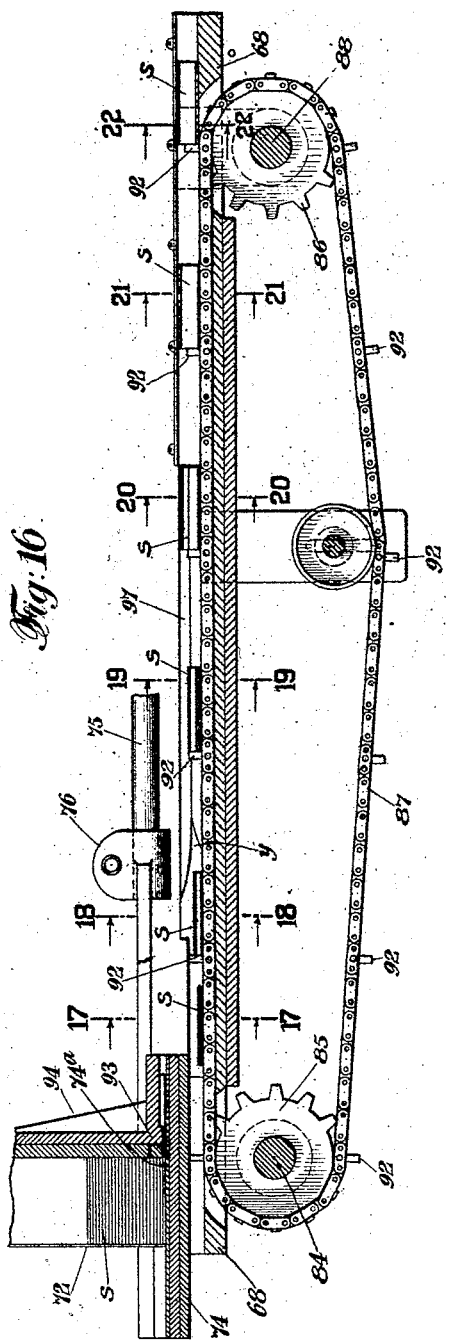
WITNESSES:
John E. Prager
Frances Griffin
INVENTORS
John W. Denmead
Jacob P. Wright
BY
John F. Nolan
ATTORNEY

UNITED STATES PATENT OFFICE.

JOHN W. DENMEAD, OF AKRON, AND JACOB P. WRIGHT, OF BARBERTON, OHIO, ASSIGNORS TO THE DIAMOND MATCH COMPANY, OF CHICAGO, ILLINOIS, A CORPORATION OF ILLINOIS.

BOX-FILLING MACHINE.

1,064,452.      Specification of Letters Patent.      Patented June 10, 1913.

Application filed August 1, 1912. Serial No. 712,624.

*To all whom it may concern:*

Be it known that we, JOHN W. DENMEAD and JACOB P. WRIGHT, citizens of the United States, and residents of Akron and Barberton, respectively, both in the county of Summit and State of Ohio, have invented certain new and useful Improvements in Box-Filling Machines, of which the following is a specification.

This invention relates to machines for filling and closing the tray-and-shuck form of box commonly employed for holding matches, having reference more particularly to certain improvements in the machine forming the subject of a pending application for Letters Patent of the United States, filed May 29, 1909, by John W. Denmead, under Serial No. 499,252. In the construction set out in the Denmead application the box-trays are delivered from a suitable source to a continuously moving conveyer and transported thereby adjacent the discharging end of a match machine in a manner to receive the matches as rapidly as they are produced; the conveyer is jarred at intervals of its travel in order to agitate, arrange and settle the matches within the trays; a reciprocative shuck-receiving device mounted adjacent the path of the conveyer is adapted to feed the box shucks to a position in alinement with the filled box trays of the conveyer, and means are provided whereby such trays are ejected from the conveyer and uniformly and positively inserted into the shucks presented thereto.

The object of the present invention is to improve the said Denmead machine in certain particulars hereinafter pointed out whereby a more rapid feeding, filling and closing of the boxes are attained, and whereby also flat or collapsed shucks may be employed.

To this end the invention comprehends various novel, simple and efficient features of construction and organization in respect more especially of means for feeding box-trays to the conveyer; means for jarring the conveyer and its contents; means for insuring the orderly delivery of the matches from the source of match supply to the trays; means for effectively opening flat shucks and advancing them in open condition to a point of delivery; means for receiving the open shucks and presenting them to the filled trays, and means for associating the trays with the shucks; all of which will be hereinafter described and claimed.

In the annexed drawings we have illustrated a preferred form of embodiment of our invention, and while we shall proceed herein to point out in detail the structural features of the mechanisms shown, it is to be understood that our invention is not restricted to the precise details to which reference may be made.

Figure 1 is a front elevation of a box filling machine embodying our invention. Fig. 1ª is a detail, in side elevation, of the shuck-conveyer and one of its supporting wheels. Fig. 2 is a plan of the machine. Fig. 2ª is a detail, in plan, of the supporting wheels for the shuck and plunger conveyers, the adjacent wheel for the tray-conveyer, the actuating gearing, and adjuncts. Fig. 3 is a bottom view of the machine. Fig. 4 is a partial elevation of the tray-receiving end of the machine. Fig. 5 is a partial transverse vertical section, as on the line 5—5 of Fig. 1. Fig. 6 is a similar section, as on the line 6—6 of Fig. 1. Fig. 7 is a longitudinal vertical section of the tray-receiving end of the machine, on a plane through the tray feeding chute, as on the line 7—7 of Fig. 6. Fig. 8 is a partial transverse vertical section as on the line 8—8 of Fig. 2. Fig. 9 is a sectional detail illustrating the latch device for the hinged yoke-frame of an overhanging shuck-guard member, as on the line 9 of Fig. 8. Fig. 10 is a partial longitudinal vertical section of the trough for the tray conveyer. Fig. 11 is a partial transverse vertical section, as on the line 11—11 of Fig. 2; the crank and pitman connection for the feed slide being shown in elevation. Fig. 12 is a similar section, enlarged, through the forward end of the trough and adjacent parts, showing, among other things, the action of the feeding dog on the shuck. Fig. 13 is a transverse vertical section through the shuck hopper, the trough below the same, and shuck-feeding slide, as on the line 13—13 of Fig. 2. Fig. 14 is a partial plan of the trough and its connections, the shuck hopper being removed. Fig. 15 is a sectional detail of the cam, slide and link devices for oscillating the delivery end of the trough, the section being as on the line 15—15 of Fig. 14. Fig. 16 is a longitudinal vertical section of the body of the trough and adjuncts, showing one of the lateral shuck-opening cam bars. Figs. 17, 18, 19, 20, 21 and 22 are transverse sections through the shuck-feeding trough, as on the lines 17—17, 18—18, 19—19, 20—20, 21—21, 22—22, respectively, of Fig. 16, showing the progressive opening action of the lateral cam bars on the shucks.

1 indicates a portion of the endless match carrier of a continuous match making machine, from which carrier the finished matches are rapidly discharged row by row by a reciprocating punch head during the operation of the machine.

2 is a horizontal bed or table supported adjacent the source of match supply, and 3 is an endless tray conveyer passing around sprocket wheels, 4, 5 mounted at or near the respective ends of the bed. The shafts 6 of these wheels are provided with bevel gear wheels 7 which mesh with similar wheels 8 on adjacent short shafts 9 extending longitudinally of and beneath the bed. The latter shafts bear spur wheels 10 which mesh with pinions 11 on a main drive shaft 12 which is journaled in bearings beneath the bed and extends nearly from end to end of the latter. The shaft 12 is provided with a driving pulley 13 which is actuated from a suitable source of power, and thus, through the gearing described, the power is transmitted to the conveyer to impart continuous motion thereto longitudinally of the bed. The speed of the conveyer bears a predetermined ratio to that of the match carrier, and hence the pulley 13 is preferably belted with a pulley on the drive shaft of the match machine. The pulley 13 may, if desired, be connected with the shaft 12 through a friction or grab clutch, the operating lever for which is indicated at 14 (Fig. 1). By properly operating the lever a slippage of the clutch connection between the pulley 13 and its shaft can be effected should it be desired at any time to vary the speed of the filling mechanism to correspond with the quantity of matches being delivered from the match machine. It has not been deemed necessary to illustrate or describe the clutch, as the same may be of any known or approved type.

The tray conveyer herein illustrated is similar in construction and operation to that shown and described in the Denmead application aforesaid; the same comprising metal links jointed together to constitute an endless chain having outwardly extending walls 15 which provide jaws by and between which the match trays (t) are held and transported across the path of the matches falling from the match carrier of the match machine.

The trays are introduced to the tray conveyer from one side of the latter, in advance of the source of match supply, by means of a plunger 16 which is reciprocative toward and from the conveyer and also longitudinally of the direction of travel of the latter. This plunger is slidingly mounted in and transversely of a slide 17, which, in turn, is fitted to a guide 17ª in the bed 2 (at the right hand thereof, as viewed in Figs. 1, 2 and 3) so as to be reciprocative longitudinally of the adjacent stretch of the conveyer. The slide is maintained in a normal position by the action of a spring 18 which encircles a suitably disposed guide stem 19 on the slide and bears against brackets 20, 21 on the slide and bed respectively. The outer end of the slide is perforated or socketed to receive the upper end of a vertical rock lever 22 which is pivoted to a depending bracket 23 on the bed, the lower arm of the lever being equipped with a roller 24 which contacts with the side-face cam 25 of a cam body 26 on the drive shaft. The contour of this cam is such that the lever is actuated to retract the slide against the action of the spring, and the slide is then permitted to advance a limited distance concurrently with the travel of the conveyer; the slide thus being bodily reciprocated longitudinally of the conveyer. During the advancement of the slide and its plunger the latter is reciprocated toward and from the conveyer by means of a bellcrank lever 27 and box-cam 28 on the cam body 26, which lever is pivoted to a depending bracket 29 on the bed. One arm of the lever 27 extends into a slot in the outer end of the plunger 16 and the other arm of the lever bears a roller 30 which is engaged with the box cam. Upon the slide, adjacent the plunger, is a stop 31 against which is seated the tray preparatory to its introduction to the conveyer by the plunger, which stop is preferably constituted by a guard member which overhangs the tray and prevents its upward displacement.

The trays are successively delivered to the slide and guard member from an inclined chute 32 down which the trays are yieldingly and progressively fed by a rotating brush wheel 33, as described in the Denmead application above referred to. The bottom of this chute for a portion of its length is preferably slotted to afford an opening 34 through which may escape any trays that have been fed to the chute lengthwise instead of crosswise of the latter. (See Fig. 7).

At or adjacent the delivery end of the chute is pivoted an angular stop member 35 which overhangs the path of the trays and is provided at its free end with a hook finger 36 which is so disposed that when the member is swung bodily forward, as when there is no delivery of matches from the match machine, the finger will engage the inside of the opposing tray and thus stop the feed of the trays from the chute. When the stop member is swung back, as seen in Fig. 1, the passage of the trays from the trough is unobstructed thereby.

The empty trays are delivered to the succeeding links of the conveyer and thereby continuously impelled in front of the match carrier, the matches as rapidly as they are discharged from the carrier thus falling directly into and progressively filling the traveling trays. To contribute to the orderly delivery of the matches to the trays we preferably arrange on the bed, directly in front of the match delivery from the carrier, a horizontal bar 37 having in its inner face vertical channels or grooves corresponding in number and relative position with a row of match holding perforations in the carrier. This bar is supported directly over the path of the outer ends of the box trays as they pass in front of the carrier, and its grooves are so located that the heads of each row of matches, preparatory to its discharge from the carrier chain, enter the grooves a short distance, and thus when the row is discharged from the chain the matches are maintained in parallelism and presented in an orderly manner to the underlying trays.

The ends of the bar are preferably supported upon hinge brackets 38 fastened to the bed, and the body of the bar is pivotally connected to an outwardly extending arm 39 which is secured to a bracket 40 on the bed by means of a thumb-screw 41, a slot for the passage of which is formed in the arm. By properly turning this thumb-screw the arm may be released and shifted to swing the groove bar on its hinges toward or from the match carrier in order to adjust the grooved face of the bar accurately in respect to the plane of the match heads and secure the bar in its position by adjustment. Also the bar may be swung backward and downward in order that ready access may be had to the trays and adjacent parts in case of accidental firing of the matches in the region of the filling station.

The upper stretch of the tray conveyer is impelled through a trough 42 supported upon or adjacent the bed, which trough is divided into a series of sections, whereof those indicated at $a$ and $b$, located respectively in front of and just beyond the carrier chain, have capacity for slight vertical vibration in order that the trays with their contained matches, while being carried through said sections $a$ and $b$, can be bodily agitated to effect the arrangement and settling of the matches within the trays. The sections $a$, $b$, are entirely separate from each other, so that each can be vibrated independently and variably in a manner to obtain the most efficient results as the speed of the machine or other conditions may require. (See Fig. 10).

Beneath the bed are journaled two rock-shafts 43, to which are secured arms 44 which extend to and are affixed to the respective sections $a$, $b$. Each of the shafts has adjustably secured to it, as by a set screw 44$^a$ (Fig. 5), the split sleeve or collar of a depending lever arm 45. This arm is provided at its lower end with a roll 46 which by adjustment of the arm longitudinally of the shaft is caused to bear upon one or the other of a series of adjacent peripheral cam surfaces 47 on a cam body 48 keyed on the drive shaft, so as thereby to effect the rapid vertical vibration of the section with which the shaft is connected. The peripheral cam surfaces are constructed differently to produce more or less vibration per minute as desired. (See Figs. 1, 2, 3 and 5.)

The box trays, filled with matches, are transported by the conveyer to the devices for ejecting the trays and inserting them into the box shucks ($s$), provision being had whereby the shucks are impelled adjacent to and longitudinally of the tray conveyer and whereby the trays and shucks are associated during their concurrent travel. For this purpose a continuously driven shuck conveyer 49 is provided. This conveyer comprises an endless chain of links, substantially similar in construction to those of the tray conveyer, supported and guided by a pair of sprocket wheels 50, 51 in such manner as to travel adjacent to one side of and concurrently with the tray conveyer, and with the links of the respective conveyers in register with each other for a certain period. One (51) of the sprocket wheels is mounted on the driven shaft 6 at the discharging end of the machine, and the other (50) is borne by a suitably spaced transverse shaft 52 having its bearings in brackets depending from the bed.

On the other side of the tray conveyer is a plunger conveyer 53 comprising an endless chain of links supported and guided by a pair of sprocket wheels 54 on the shafts (52, 6) for the wheels of the shuck conveyer, and adapted to be impelled in the same direction and at the same speed as the latter. The links of the plunger conveyer are constructed with transverse guides 55 for plungers 56 which are adapted to be reciprocated into and from the links of the tray conveyer during their concerted travel therewith and thus push the filled trays bodily from the tray conveyer and into the opposing shucks in the shuck conveyer. The timely reciprocation of the plungers 56 is accomplished through the agency of a suitably-disposed V-shaped cam-way 57 into which enter studs or rollers 58 on the respective plungers 56 as the latter are being carried adjacent the upper stretch of the tray conveyer. This camway, which is formed in the under side of a plate 59 bolted to the bed 2, is of sufficient length and angularity to effect, first, the gradual inward projection of the succeeding plungers into the links of the chain conveyer until the opposing trays have been completely associated with their respective shucks in the shuck conveyer, and then the corresponding gradual retraction of the plungers from the links of the tray conveyer. (See Figs. 1, 11 and 12).

At the point where the plungers begin to enter the links of the tray conveyer and proceed to push the filled tray into the shuck, an overhanging guard member for the shuck is provided, the same comprising a shoe 60 beveled on its front edge and carried by a yoke-frame 61 which extends over the cam plate and is hinged to lugs 62 thereon. This frame is locked in position by a slide bolt 63 which being fitted to a guide way on the plate 59, is normally held upon a lateral shoulder on the frame by means of a suitably-disposed spring 63$^a$. (See Fig. 9). By withdrawing the bolt from the shoulder the frame can be readily released, and then raised to facilitate access to the underlying shucks if occasion require.

Adjacent the outer edge of the shuck conveyer is a plate 64 which forms a back stop for the shucks as the filled trays are being pushed thereinto by the plungers. This plate is pivoted at its ends to bracket arms 65 on the bed and is held yieldingly in active position by means of a spring 66 which is secured to an arm 67 on the plate and to the bed. (See Fig. 8). Thus the plate exerts a yielding action on the boxes during the association of the trays and shucks. When the trays have been entered in the shucks the conveyer 49 in its travel transports them to a point of discharge.

As the active stretch of the shuck conveyer passes around the sprocket wheel 50 a slight spreading or diverging of the proximate walls of the links is effected, which walls as they pass the vertical center of the wheel are caused to resume their normal parallel position. Just before adjacent walls occupy this position an open shuck is freely entered in the space between the same, and as the conveyer progresses the shucks are laterally supported by and between the upright jaws. The shucks, in open condition, are successively delivered to the shuck conveyer from a rearwardly extending trough structure 68, the forward end of which is slidingly supported on the bed and the rearward end on a suitable standard 69, as presently explained. This trough structure includes two sides 70 and a bottom 71, and sustains at its outer end an upright hopper 72 in which are packed one upon another the flat or collapsed shucks; the whole being closely pressed down by a weighted plunger 73 which is arranged to slide vertically within the hopper. The hopper is preferably hinged at its lower end to one side of the trough, as at $x$, so that the hopper can be bodily swung over from the trough to permit ready access to the underlying part of the latter and the devices therein as occasion may require.

Guided horizontally in the side walls of the trough, so as to be reciprocative directly under the hopper, is a slide 74 having on its upper surface a shouldered member 74$^a$ which is adapted in the reciprocation of the slide to engage the rearward end of the lowermost shuck of the pile and push it endwise from the bottom of the hopper and toward the body of the trough. The leading portion of the slide is slotted to afford an opening of proper width through which the ejected shuck falls to the bottom of the trough during the return stroke of the slide. The slide is connected by means of a rod 75 with a cross head 76 which bridges and embraces the trough near the discharge end of the latter, and this cross-head is connected by means of a pitman 77 with a crank 78 on one end of a shaft 79 having its bearings in arms 80 extending from a depending yoke bracket 81 on the trough, which bracket, it is to be noted, is centrally supported on the standard 69 by a collar and pivot connection so as to have capacity for horizontal oscillation. On the opposite end of the shaft 79 is a pinion 82 in mesh with a gear wheel 83 on a rearward shaft 84 having its bearings in the sides of the yoke bracket 81, whereby when the shaft 84 is actuated reciprocation of the cross-head and guide is effected. The shaft 84 bears a sprocket wheel 85 around which, and a similar wheel 86 adjacent the shuck conveyer, passes a sprocket chain 87, the upper horizontal stretch of which extends along the inner surface of the bottom of the trough. The shaft 88 of the wheel 86 has its bearings in depending brackets 89 on the main bed 2 and is equipped with a sprocket wheel 90 which is connected with and driven from the drive shaft 12 by a sprocket chain 91 and wheel 91$^a$. (See Fig. 11). By this system of sprocket gearing the power is transmitted from the drive shaft 12 to the shaft 84 under the shuck hopper; the active stretch of the sprocket chain 87 continuously traveling within the trough. This chain 87 is provided throughout its length with lugs 92 which are spaced to engage the rearward ends of successive shucks as they are delivered from the hopper to the trough, and thus impel them along the trough toward the shuck conveyer.

In order to prevent the discharge from the bottom of the hopper of more than one shuck at a time, there is provided at the delivery opening of the hopper, adjacent the trough a cut-off plate 93 which is formed on or affixed to a vertical bracket piece 94 slidingly fitted to a guide way in the opposing wall of the hopper. The upper end of this piece is adjustably connected with a bracket 94' on the wall of the hopper by means of a set-screw 95 which passes freely through a hole in the bracket and engages a threaded orifice in a lug on the piece 94; an encircling spring 96 on the screw being interposed between the lug and the bracket. By properly turning the screw the piece 94 and its plate 93 can be nicely adjusted vertically in order to provide at the bottom of the hopper any desired width of opening for the efficient ejection of the flat shucks severally by the slide. The spring holds the plate 93 down with a yielding pressure so that in case of any clogging at the delivery opening the plate will be raised to allow the passage of the obstruction without any undue strain on the actuating parts.

The inner side walls of the trough are parallel at the point where the shucks are delivered thereto and thence converge toward the shuck conveyer. On these inner side walls are fastened bars 97 having oppositely beveled or inclined cam-like surfaces 98 which extend forwardly from a point directly in advance of the region of delivery of the flat shucks to the trough. The portions of the bars immediately in rear of these inclined surfaces are plane and are spaced in parallelism substantially equal to the width of the flat shuck, the plane and inclined surfaces being angularly merged to produce >-shaped entrance guides as indicated at y. (Fig. 16).

As the flat shucks are severally delivered from the hopper to the trough by the slide and successively engaged and carried onward by the lugs of the chain as above described, the forward end of each shuck is driven between and against the opposing beveled cam surfaces of the guide bars. These surfaces by virtue of their angularity tend to keep the lateral edges of the shuck horizontal, and as the bars converge in the direction of travel of the shucks it follows that such lateral edges are gradually pressed toward each other in a manner to open the shuck. (See Figs. 17 to 22, inclusive). At the point where the shuck leaves the channeled portions of the guide strips 97 it is sufficiently open to enter the rectangular space formed by the continuation of the trough, and hence by the action thereon of the converging walls of the trough the traveling shuck is brought into final rectangular form for insertion into the opposing link of the shuck conveyer.

The means for introducing the open shuck to the conveyer includes a vibratory dog 99 which is carried by and partakes of the motion of the reciprocating cross-head 76. (See Figs. 11 and 12). This dog comprises an angular plate which is suitably hinged or pivoted on a pin on the cross-head. The forwardly extending member of the plate overhangs the longitudinal path of the shucks and inclines downwardly to the trough, the free end of such member being equipped on its underside with a beveled shoe 100. The vertical member of the dog extends in front of the free projecting end of a spiral spring 101 borne by a stud on a bracket piece 102. This bracket piece is affixed to the trough and affords a guide for the rod 75 of the slide 74. On the rearward travel of the slide and cross-head the under-beveled face of the shoe takes against and rides upon the top of the opposing shuck within the trough, and when it clears such shuck the up-projecting member of the dog contacts with the opposing spring 101 and is thereby yieldingly forced forward in a manner to depress the leading end of the other member of the dog and permit the shoe 100 in the forward movement of the dog to impinge against the opposing end of the top of the said shuck and bodily advance the latter. The forward movement of the dog is more rapid than that of the traveling sprocket chain 87, and hence the dog pushes the shuck ahead of the impelling lug of such chain and delivers the shuck bodily to the shuck conveyer 49. (See Figs. 11 and 12). The forwardly extending member of the dog is preferably provided with a cross-piece 100$^a$ which rides on the top edges of the trough and serves to guide and steady the dog during its movements.

As an auxiliary means to position the shucks within the shuck conveyer, we affix to the side of the cross-head a plunger 103 which extends toward the conveyer in such relation thereto that during each stroke of the cross-head toward the conveyer the free end of the plunger bears against the opposing end of that shuck inserted by the dog in the immediately preceding stroke of the cross-head. (See Figs. 2 and 14).

In order to compensate for the continuous travel of this conveyer during the shuck inserting operation, the delivery end of the trough is given a slight reciprocation longitudinally of the conveyer. Consequently the yoke bracket 81 at the rearward end of the trough is pivotally supported on its standard as above indicated, and means are provided whereby the forward end of the trough is moved forward and back at proper intervals in respect to the travel of the succeeding links of the shuck conveyer. Such means in a simple and desirable form includes a slide 104 which is arranged in a suitable guide bracket 105 laterally of the delivery end of the trough, and is connected with the trough by a link 106. On the underside of this slide are two spaced pins or rolls 107 between which extends the periphery of a cam 108 fast on the driven shaft 88, which cam is properly formed and timed to reciprocate the slide 104 and impart the requisite compensatory movements to the trough and the shuck inserting devices carries thereby. (See Figs. 14 and 15).

We claim—

1. The combination with a source of match-supply, of means for impelling box-trays consecutively to and past said source of supply, an endless chain shuck-conveyer and an endless chain plunger-conveyer between which the filled trays pass after they leave the source of supply, means for impelling said conveyers concurrently with and in the same direction as the filled trays, plungers in the plunger-conveyer, and means for reciprocating said plungers during their travel adjacent the trays, whereby said trays are progressively shifted from their path into shucks in the shuck conveyer.

2. The combination with a source of match supply, of an endless chain tray-conveyer, an endless chain shuck-conveyer, and an endless chain plunger-conveyer, said tray-conveyer being arranged to travel to and past the source of match supply and thence between the shuck and plunger conveyers, means for concurrently impelling the adjacent portions of said conveyers in the same direction, plungers in the plunger-conveyer, and means for reciprocating said plungers during their travel adjacent the tray-conveyer, whereby the filled trays are progressively ejected from the last-named conveyer and inserted into shucks in the shuck-conveyer.

3. The combination with a source of match supply, of an endless chain tray-conveyer, an endless chain shuck-conveyer, and an endless chain plunger-conveyer, said tray-conveyer being arranged to travel to and past the source of match supply and thence between the shuck and plunger conveyers, means for concurrently impelling the adjacent portions of said conveyers in the same direction, means for supplying shucks to the shuck-conveyer, plungers in the plunger-conveyer, and means for reciprocating said plungers during their travel adjacent the tray-conveyer, whereby the filled trays are progressively ejected from the last-named conveyer and inserted into shucks in the shuck-conveyer.

4. The combination with a source of match supply, of an endless chain tray-conveyer, an endless chain shuck-conveyer, and an endless chain plunger-conveyer, said tray-conveyer being arranged to travel adjacent to and past the source of match supply and thence between the shuck and plunger conveyers, means for concurrently impelling the adjacent portions of said conveyers in the same direction, means for vibrating said tray-conveyer during a part of its travel, plungers in the plunger-conveyer, and means for reciprocating said plungers during their travel adjacent the tray-conveyer, whereby the filled trays are progressively ejected from the last-named conveyer and inserted into shucks in the shuck-conveyer.

5. The combination with a source of match supply, of an endless chain tray-conveyer traveling in a path adjacent thereto, means for supplying trays to said conveyer, an endless chain shuck-conveyer, means for supplying shucks thereto, an endless chain plunger-conveyer, plungers thereon, means for continuously and concurrently impelling said conveyers whereby the trays on the tray-conveyer after they have been supplied with matches are carried between the active stretches of the shuck and plunger conveyers, and in endwise alinement with the shucks and plungers of the latter conveyers, and means for reciprocating said plungers to and from the tray-conveyer while the three-named conveyers are running side by side, whereby the filled trays in the tray-conveyer are pushed into their complementary shucks borne by the shuck-conveyer.

6. The combination with a source of match supply, of a tray conveyer adjacent thereto, means for continuously impelling said conveyer, a tray support laterally of the conveyer and in advance of the source of match supply, means for reciprocating said support longitudinally of the path of travel of the conveyer, a plunger in said support, and means for reciprocating said plunger toward and from the conveyer during its motion longitudinally of the conveyer.

7. The combination with a source of match supply, of a tray conveyer adjacent thereto, means for continuously impelling said conveyer, a tray support laterally of the conveyer and in advance of the source of supply, a tray stop on said support, means for successively feeding trays to and upon said support and against the stop, means for reciprocating said support and its stop longitudinally of the path of travel of the conveyer, a plunger in said support, and means for reciprocating said plunger toward and from the conveyer during its motion longitudinally of the conveyer.

8. The combination with a source of match supply, of a tray conveyer adjacent thereto, a tray-support, a chute for box trays leading to said support, means for pushing the trays successively from said support to the conveyer, and a vibratory stop member mounted at the discharging end of the chute and adapted to be manually swung into and from the path of the trays.

9. The combination with a source of match supply, of a trough adjacent thereto having a vertically movable section, an endless flexible conveyer for box trays arranged to travel within and along the said trough, means for feeding box trays to said conveyer in advance of the source of match supply, a shaft, a series of variably-acting cams thereon, and a vibratory connection between said section and cams having provision for adjustment relatively to the cams, whereby any one of the cams may be caused to act upon said connection.

10. The combination with a source of match supply, of a trough adjacent thereto having vertically-movable sections, an endless flexible conveyer for box trays arranged to travel within and along the said trough, means for feeding box trays to said conveyer at a point in advance of the source of match supply, rock-shafts, vibratory arms on said shafts connected with the respective sections, a shaft, plural series of variably-acting cams thereon, one series for each section, levers extending from the rock shafts to the respective series of cams, and means whereby any cam of a series may be caused to act on the proximate vibratory arm of the rock-shaft.

11. The combination of a tray-conveyer comprising an endless chain of tray-holding links, a shuck-conveyer comprising an endless chain of shuck-holding links, means for continuously and concurrently impelling said conveyers, means for progressively pushing the trays from the tray-conveyer into their complementary shucks on the shuck-conveyer, a guard member overhanging the path of the shuck-conveyer, and a hinged frame supporting the said guard member.

12. The combination of a tray-conveyer comprising an endless chain of tray-holding links, a shuck-conveyer comprising an endless chain of shuck-holding links, means for continuously and concurrently impelling said conveyers, means for progressively pushing the trays from the tray-conveyer into their complementary shucks on the shuck-conveyer, a movable plate adjacent the outer edge of the shuck-conveyer providing a back stop for the shucks as the filled trays are being inserted therein, and means tending to maintain said plate yieldingly in acting position.

13. The combination with a continuously movable conveyer for a row of box-shucks, of a head reciprocative longitudinally of the path of travel of the shucks on said conveyer, a feed device carried by said head, and means whereby said device during its travel with the head is periodically shifted in relation to the leading shuck and thus positioned to engage the rearward end of the latter during the forward stroke of the head and advance said shuck beyond the conveyer.

14. The combination with a continuously movable conveyer for a row of box-shucks, of a head reciprocative longitudinally of the path of travel of the shucks on said conveyer, an angular shuck-engaging device pivoted to said head, one member of said device extending forwardly of the head and adjacent the path of the leading shuck, and means for oscillating said device in relation to the said shuck, whereby the said device in its forward stroke is caused to engage the said shuck and advance it beyond the conveyer.

15. The combination with a continuously movable conveyer for a row of box-shucks, of a head reciprocative longitudinally of the path of travel of the shucks on said conveyer, an angular shuck-engaging device pivoted to said head, one member of said device extending forwardly of the head and in proximity to the path of the leading shuck, and a stop extending into the path of the other member of the said device during its rearward stroke with the head, whereby the said device is tilted and positioned to engage the said shuck and advance it beyond the conveyer during the forward stroke of the device.

16. The combination with a continuously movable conveyer for a row of box-shucks, of a head reciprocative longitudinally of the path of travel of the shucks on said conveyer, an angular shuck-engaging device pivoted to said head, one member of said device extending forwardly of the head and in proximity to the path of the leading shuck, a spring, and means for supporting it in the path traversed by the other member of the said device during the rearward stroke of the said device with the head, whereby the said device is tilted and positioned to engage the said shuck and advance it beyond the conveyer during the forward stroke of the device.

17. The combination with a continuously-movable conveyer for articles to be fed, of a reciprocative head movable in the same direction as and at a higher rate of speed than the active stretch of said conveyer and a vibratory dog on said head positioned to engage the successive articles on the conveyer and advance them longitudinally of and beyond the said conveyer.

18. The combination with a continuously-movable conveyer for articles to be fed, of a head reciprocative longitudinally of the path of travel of the articles on the conveyer, a vibratory dog on said head positioned to engage the successive articles and advance them longitudinally of and beyond the conveyer, and a second conveyer into which the said articles are successively delivered by the said dog.

19. The combination with a hopper for flat box-shucks, of means for ejecting the shucks successively therefrom, a continuously-moving conveyer on which said shucks are deposited and thereby impelled, means in the path of the traveling shucks for laterally pressing them to open condition, and means moving at a higher rate of speed than the conveyer for engaging the open shucks and advancing them beyond the conveyer.

20. The combination with a hopper for flat box-shucks, of a reciprocating slide for engaging the lowermost shucks and ejecting them successively from the hopper, a continuously-moving conveyer on which said shucks are deposited, means in the path of the traveling shucks for laterally pressing them to open condition, and a reciprocating device movable concurrently with the slide and adapted to engage the open shucks in succession and advance them beyond the conveyer.

21. The combination with a hopper for flat box-shucks, of a reciprocating slide for engaging the lowermost shucks and ejecting them successively from the hopper, a trough to receive the shucks, a continuously moving conveyer therein upon which the shucks are deposited, lateral cam surfaces in said trough for pressing the shucks to open condition, a cross-head connected with the slide, connections whereby the slide and cross-head are reciprocated through the motion of the chain, and means carried by the cross-head adapted to engage the open shucks in succession and advance them beyond the conveyer.

22. The combination with a shuck-conveyer, of a support extending outwardly therefrom adapted to contain a row of box shucks, a head reciprocative longitudinally of said support, a feed device carried by said head, means whereby said device during its travel with the head is periodically shifted in relation to the opposing shuck and thus positioned to engage the rearward end of the latter and advance it to the shuck-conveyer, and a plunger carried by said head adapted to act against the opposing end of the shuck thus seated in the conveyer.

Signed at Barberton in the county of Summit and State of Ohio this 29 day of July A. D. 1912.

JOHN W. DENMEAD.
JACOB P. WRIGHT.

Witnesses:
E. A. JACOBS,
SABINA PARKS.